US009014311B1

(12) United States Patent
Cudak et al.

(10) Patent No.: US 9,014,311 B1
(45) Date of Patent: Apr. 21, 2015

(54) INTERLEAVED MULTI-BEAM ACQUISITION WAVEFORM PROVIDING CONCURRENT BEAM SELECTION, AUTOMATIC GAIN CONTROL (AGC) AND AUTOMATIC FREQUENCY CORRECTION (AFC)

(71) Applicant: Nokia Solutions and Networks Oy, Espoo (FI)

(72) Inventors: Mark Cudak, Rolling Meadows, IL (US); Timothy Thomas, Palatine, IL (US); Thomas Kovarik, Grayslake, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/054,065

(22) Filed: Oct. 15, 2013

(51) Int. Cl.
*H04L 27/08* (2006.01)
*H04B 7/04* (2006.01)
*H04B 7/08* (2006.01)
*H04B 7/06* (2006.01)
*H04L 25/06* (2006.01)
*H04B 1/14* (2006.01)

(52) U.S. Cl.
CPC ............ *H04B 7/0408* (2013.01); *H04B 7/0885* (2013.01); *H04B 7/061* (2013.01); *H04L 25/06* (2013.01); *H04B 1/14* (2013.01)

(58) Field of Classification Search
CPC .... H04B 7/0408; H04B 7/0885; H04B 7/061; H04B 1/14; H04L 25/06
USPC .......................... 375/267, 299, 344, 345, 347
See application file for complete search history.

(56) References Cited

U.S. PATENT DOCUMENTS

2006/0133544 A1   6/2006  Kawada et al.
2011/0310883 A1  12/2011  Takano et al.
2014/0098912 A1*  4/2014  Yin et al. ...................... 375/345

OTHER PUBLICATIONS

Christopher Hansen, et al., "NT-11 Beamforming Introduction", IEEE 802.11-10/0430r1, May 2010.
IEEE Standard for Information technology—Telecommunications and information exchange between systems Local and metropolitan area networks—Specific Requirements "Part 11: Wireless LAN Medium Access Control (MAC) and Physical Layer (PHY) Specifications Amendment 3: Enhancements for Very High Throughput in the 60 GHz Band" IEEE Std 802.11 ad-2012 (Dec. 28, 2012), 628 pages.
International Search Report dated Jan. 30, 2015, corresponding to Int'l. Patent Appln. No. PCT/EP2014/071730.

* cited by examiner

*Primary Examiner* — Leon Flores
(74) *Attorney, Agent, or Firm* — Squire Patton Boggs (US) LLP

(57) ABSTRACT

Systems, methods, apparatuses, and computer program products for an interleaved multi-beam acquisition waveform providing concurrent beam selection, automatic gain control (AGC) and automatic frequency correction (AFC) are provided. The access point (AP) may send an acquisition waveform on multiple beams, then return and retransmit an AFC on the multiple beams thus interleaving beam switching with the acquisition and frequency correction waveforms. AGC correction can be deferred until the end, relying on the fact that the transmitter may be detected at close range using a one of the multi-beams that is attenuated.

42 Claims, 9 Drawing Sheets

INTERLEAVED MULTI-BEAM ACQUISITION WAVEFORM PROVIDING CONCURRENT BEAM SELECTION, AUTOMATIC GAIN CONTROL (AGC) AND AUTOMATIC FREQUENCY CORRECTION (AFC)

BACKGROUND

1. Field

Certain embodiments generally relate to communication systems and, in particular, may relate to millimeter wave (mmWave) communications.

2. Description of the Related Art

A global bandwidth shortage facing wireless carriers has motivated the consideration of the underutilized millimeter wave (mmWave) frequency spectrum for future broadband cellular communication networks. mmWave (or extremely high frequency) generally refer to the frequency range between 30 and 300 gigahertz. This is the highest radio frequency band in practical use today. Radio waves in this band have wavelengths from ten to one millimeter, giving it the name millimeter band or millimeter wave.

mmWave systems will be characterized by higher propagation loss than lower frequencies. To combat this higher loss mmWave systems will employ antenna arrays with a large number of elements especially at the access point. The large arrays overcome the higher propagation loss by concentrating the energy in the best direction to the mobile through the use of narrow beams. Since mmWave systems will be characterized by high bandwidths, the analog to digital converters (ADCs) and digital to analog converters (DACs) will use extreme amounts of power. To minimize power consumption typically only a single ADC and DAC will be used for all antennas in one array meaning the beamforming will need to be done at radio frequency (RF). Besides data transmissions these narrow beams may need to be used for other transmissions such as for initial acquisition of timing and frequency. The use of these narrow beams at RF makes the use of existing acquisition methods difficult and inefficient, hence there is a need for an efficient method of initial acquisition for mmWave communications.

SUMMARY

One embodiment is directed to a method including transmitting, by an access point in a millimeter wave (mmWave) system, a first multi-beam sequence comprising a first burst type repeated on a defined pattern of antenna beams. The method may further include transmitting a second multi-beam sequence comprising a second burst type repeated on said defined pattern of antenna beams after an automatic frequency correction (AFC) interval.

Another embodiment is directed to an apparatus including at least one processor, and at least one memory comprising computer program code. The at least one memory and the computer program code are configured, with the at least one processor, to cause the apparatus at least to transmit a first multi-beam sequence comprising a first burst type repeated on a defined pattern of antenna beams, and transmit a second multi-beam sequence comprising a second burst type repeated on said defined pattern of antenna beams after an automatic frequency correction (AFC) interval.

Another embodiment is directed to a computer program embodied on a computer readable medium. The computer program is configured to control a processor to perform a process including transmitting, by an access point in a millimeter wave (mmWave) system, a first multi-beam sequence comprising a first burst type repeated on a defined pattern of antenna beams. The process may further include transmitting a second multi-beam sequence comprising a second burst type repeated on said defined pattern of antenna beams after an automatic frequency correction (AFC) interval.

Another embodiment is directed to a method including setting, by a user device, automatic gain control (AGC) in a receiver of the user device to a large gain. The method may further include detecting at least one acquisition burst in a multi-beam acquisition sequence, and detecting at least one corresponding automatic frequency correction (AFC) burst in a multi-beam AFC sequence one AFC interval later.

Another embodiment is directed to an apparatus including at least one processor, and at least one memory comprising computer program code. The at least one memory and the computer program code are configured, with the at least one processor, to cause the apparatus at least to set automatic gain control (AGC) in a receiver of the user device to a large gain, detect at least one acquisition burst in a multi-beam acquisition sequence, and detect at least one corresponding automatic frequency correction (AFC) burst in a multi-beam AFC sequence one AFC interval later.

Another embodiment is directed to a computer program embodied on a computer readable medium. The computer program is configured to control a processor to perform a process including setting automatic gain control (AGC) in a receiver of the user device to a large gain. The process may further include detecting at least one acquisition burst in a multi-beam acquisition sequence, and detecting at least one corresponding automatic frequency correction (AFC) burst in a multi-beam AFC sequence one AFC interval later.

BRIEF DESCRIPTION OF THE DRAWINGS

For proper understanding of the invention, reference should be made to the accompanying drawings, wherein.

DETAILED DESCRIPTION

Figure 1:
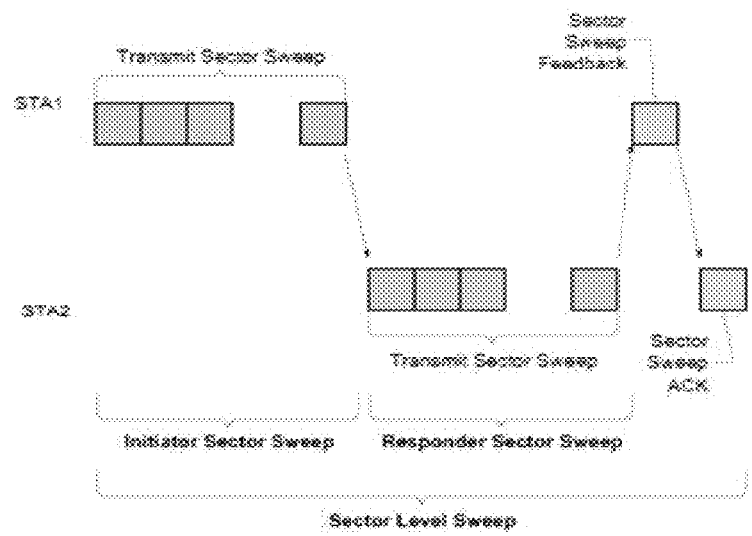
FIG. 1 illustrates an example of a sector level sweep packet sequence.

It will be readily understood that the components of the invention, as generally described and illustrated in the figures herein, may be arranged and designed in a wide variety of different configurations. Thus, the following detailed description of the embodiments of systems, methods, apparatuses, and computer program products for an interleaved multi-beam acquisition waveform providing concurrent beam selection, automatic gain control (AGC) and automatic frequency correction (AFC), as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments. Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

mmWave communications will typically be characterized by either line of sight links or single-bounce reflection links. To achieve these narrow links, at least one end of the communication system should have a relatively large antenna array (typically >=16 antennas). Two applications are usually considered for mmWave radio: backhaul and access. In mmWave backhaul, it is likely both ends of the link have a large antenna array since power consumption will be less of an issue than at the User Device (UD) end in access communications. In mmWave access, it is most likely that only one end of the link, the Access Point (AP), will have a large antenna array, and the UD would have a small array to keep power consumption low. In the backhaul case, both ends of the link are likely to have arrays for two different polarizations and may even have multiple arrays pointed in different directions (e.g., if patch antennas are used since patch antennas are characterized by direction elements which may have around a 60 degree beamwidth in azimuth and elevation). However, in the access case, because of power-consumption issues, the UD may likely only have an array with a single polarization.

Figure 2:
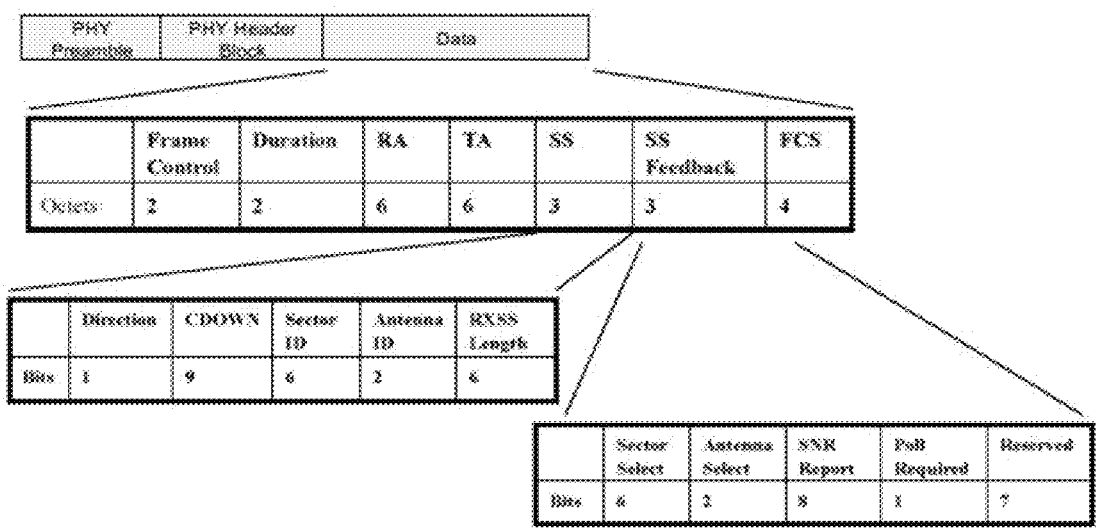
FIG. 2 illustrates an example sector sweep frame format.

IEEE 802.11ad defines a synchronization method for two stations using multiple beams. The description of the method is best captured in contribution IEEE 802.11-10/0430r1, which describes a sector level sweep that transmits a packet per each beam including a countdown function and sector identifier as illustrated in FIG. 1. Each block in FIG. 1 represents an entire packet. Details of the packet format are illustrated in FIG. 2 which provides the physical layer frame format. Each frame contains a PHY preamble and PHY frame format which would be used for Automatic Gain Control (AGC) and Automatic Frequency Correction (AFC).

Figure 4:
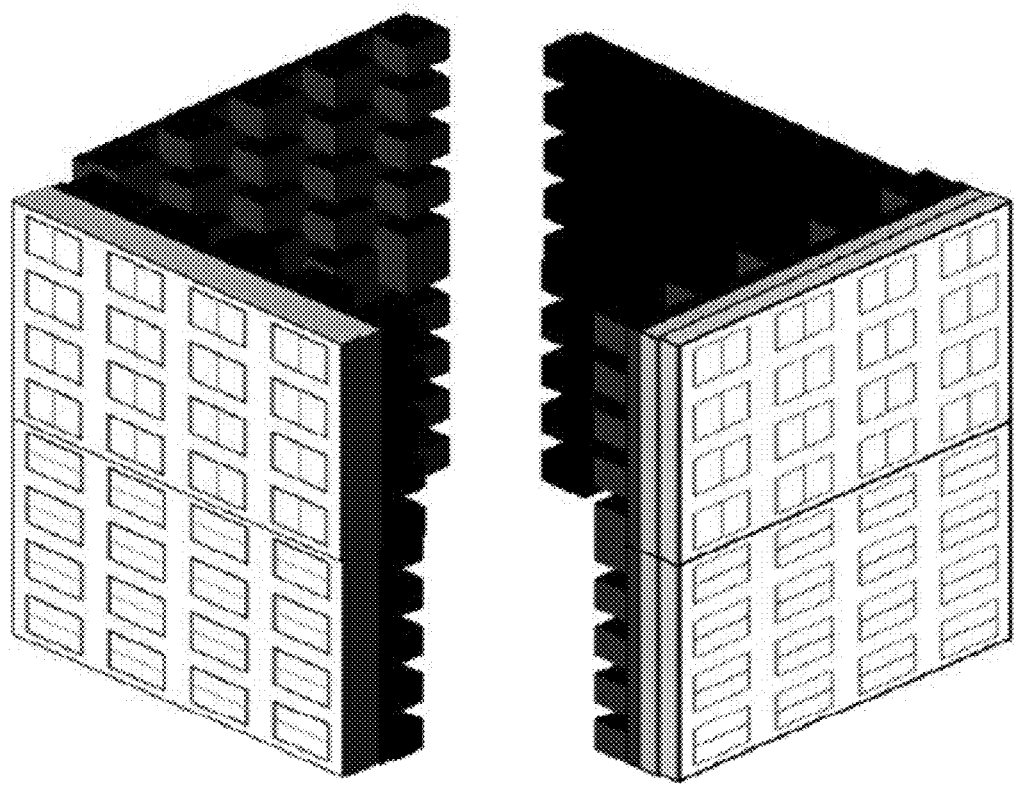
FIG. 4 illustrates one example of an AP antenna set up with multiple arrays of different polarizations pointed in different directions, according to an embodiment.

Before a high-capacity link can be established, the antenna arrays at both ends will need to have beams pointed in the right direction and may even need to choose a best polarization. However, since the beamforming is done at RF/analog (meaning there is only a single transceiver (or DAC/ADC) for each array), only a single beam for a given polarization can be pointed in a given direction at a particular time. FIG. 4, for example, illustrates a possible antenna layout for an AP. In this example, there are 8 arrays with pairs of arrays pointing the same direction, but with each array in a pair containing antennas of different polarizations. For this AP there would only be 8 transceivers and only one transceiver is connected to each array. It is noted that FIG. 4 illustrates just one possible arrangement, and that other arrangements are possible according to other embodiments.

The beam alignment problem is compounded by the conventional communication system challenges of frequency correction and gain control. Prior to synchronization, the AP and UD will have different frequency references within a specified tolerance and the UD will have correct its frequency offset. In addition, the UD will have limited range of input power to its Analog-to-Digital Converter (ADC) and, therefore, must adjust the gain of the analog input stages to insure the desired signal is in the correct range. However, the signal power will be affected by both the antenna beam pattern and the underlying pathloss.

Certain embodiments of the invention greatly reduce the system acquisition time of, for example, a fifth generation (5G) mmWave system by performing the beam selection, Automatic Gain Control (AGC) and Automatic Frequency Correction (AFC) concurrently. In addition, initial timing synchronization (i.e., determining the start of a frame or super-frame boundary) can be done concurrently with AGC and AFC. In effect, an embodiment interleaves the beam switching with the process of AFC and AGC. Some embodiments propose that the AP send an acquisition waveform on multiple beams, then return and retransmit an AFC on the multiple beams thus interleaving beam switching with the acquisition and frequency correction waveforms. Finally, an embodiment defers AGC correction until the end, relying on the fact that the transmitter may be detected at close range using a one of the multi-beams that is attenuated.

As mentioned above, certain embodiments are directed to an interleaved multi-beam acquisition and frequency correction waveform that provides concurrent beam selection, automatic gain control (AGC) and automatic frequency correction (AFC). For example, in one embodiment, the AP may be configured to transmit a multi-beam acquisition sequence comprising a short acquisition burst repeated on a defined pattern of antenna beams, to transmit a multibeam AFC sequence comprising a short AFC burst repeated on the same defined pattern of antenna beams and starting a fixed "AFC interval" after the multi-beam acquisition sequence. Optionally, the AP may be configured to communicate the multi-beam pattern if it is not known by the AP and UD a priori. In addition, the AP may be configured to repeat the multi-beam acquisition sequence and possibly the multi-beam AFC sequence to allow AGC adjustment.

Correspondingly, in one embodiment, the UD may be configured to set the AGC in the receiver to maximum gain (such that the noise floor is at the bottom of the ADC range), to detect one or more acquisition bursts in the multi-beam acquisition sequence, and to detect the corresponding AFC bursts in the multi-beam AFC sequence one AFC interval later. Additionally, the UD may be further configured to calculate the frequency offset based on the detected acquisition burst and AFC burst, to receive the communication of the multi-beam pattern if it is not known a priori, and to reduce the AGC gain setting to see if a beam with a stronger signal might be detected.

As would be understood by one of ordinary skill in the art, in order to accurately measure frequency offsets in low signal to noise, sufficient time must elapse between two reference symbol such that frequency drift creates a large enough rotation in the reference symbol that may be detected above the noise floor. The amount time that is deemed sufficient depends on the relative frequency offset between transmitter and receiver, which is referred to herein as the "AFC interval." Also, as would be understood by one of ordinary skill in the art, to accurately detect the acquisition signal, the AGC should be set to meet the strongest signal whilst not being set too high with respect to the weakest signal. In some cases, a preamble is sent so that the AGC algorithm can adapt the gain setting prior to detecting the waveform.

Conventionally, the AGC and AFC are run independently on each selected beam. As a result, the duration elapsed on each individual beam can be quite long. Stepping through multiple beams (e.g. 32, 64 or 128) can then take quite a long time and create significant system overhead. Prior art systems, such as 802.11ad discussed above, will also transmit control information on each beam further elongating the time spent per beam.

However, embodiments of the present invention are able to greatly reduce the system acquisition time by performing the beam selection, automatic gain control and automatic frequency correction concurrently. In effect, certain embodiments interleave the beam switching with the process of AFC and AGC. One embodiment provides that the AP send an acquisition waveform on multiple beams, then return and retransmit an AFC on the multiple beams thus interleaving beam switching with the acquisition and frequency correction waveforms. In addition, an embodiment may defer AGC correction until the end relying on the fact that the transmitter may be detected at close range using a one of the multi-beams that is attenuated.

In the case where dwell per beam is governed by the AFC interval, $T_{AFC}$, certain embodiments can reduce the total acquisition overhead by 40 fold. Consider the case where 128 beams are evaluated, with the prior art $128 \times T_{AFC}$ would be the length of time required to evaluate all beams. Embodiments of the invention, however, would only require $3 \times T_{AFC}$ to complete the acquisition process. If only 32 beams are evaluated, then embodiments may offer at least a savings of 10 fold.

Figure 3:
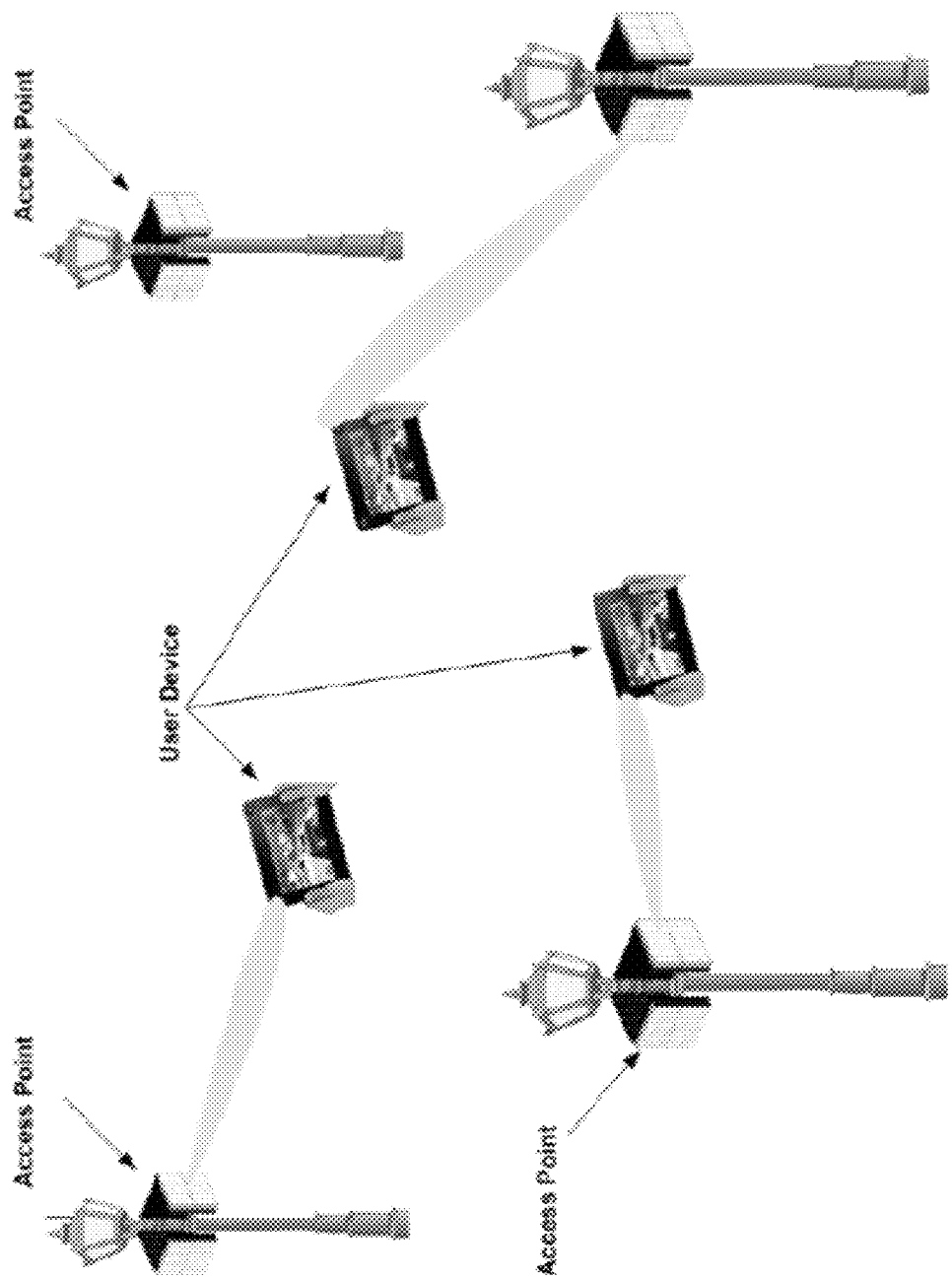
FIG. 3 illustrates an example of an mmWave system including APs and UDs, according to one embodiment.

One example use case for certain embodiments of the invention is, for instance, a 5G cellular system employing mmWave frequencies for communication in the enhanced local access environment. However, other use cases may also be applicable according to some embodiments. FIG. 3 illustrates an example of a mmWave system with 4 APs and 3 UDs. Each AP has a large antenna array composed of 4 panels with 16 elements per panel, for example. The UD is illustrated as having two smaller panels of antenna arrays of 4 elements per panel, for example. It should be noted that embodiments of the invention are not limited to the configuration depicted in FIG. 3. In other words, the number of APs and UDs and their panels/elements, as well as their location, is merely exemplary as other configurations are also contemplated within embodiments of the invention.

In mmWave communications, the envisioned AP will likely not be just a single array as is the case in non-mmWave frequencies, but may contain multiple antenna arrays of varying polarization arranged to point in different directions. As mentioned above, FIG. 4 illustrates an example possibility for an antenna array design of a mmWave AP. For example, the AP may be made up of a few large antenna arrays which are themselves patch antennas. Patch antennas are characterized by being very directional in nature (i.e., they have at most a 90 degree beamwidth with 60-70 degrees being more typical) and, therefore, multiple of these arrays may need to be placed around a device for uniform coverage. Since a given element in the array will have a unique polarization, arrays for beamforming purposes will be made up of elements of a given polarization.

In the example of FIG. 4, there are two 4×4 arrays of a given polarization pointed in a given direction and to get uniform coverage in azimuth there are four arrays arranged around the AP. In this case, the 3 dB beamwidth of the patch antennas will be around 60 degrees. For the AP, since power consumption is less of an issue and coverage is important, there may be a baseband processing unit (i.e., a transceiver) behind each array. Thus, for the AP of FIG. 4, there may be 8 total transceivers. Specifically, in this example, there may be one transceiver for each array of 16 elements or 2 per each side of the cube.

Figure 5:
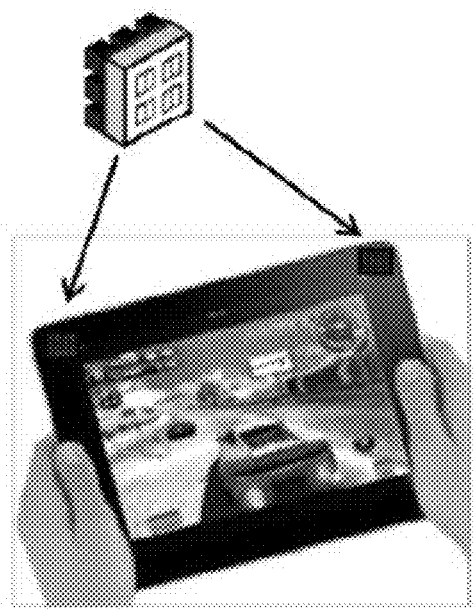
FIG. 5 illustrates an example of a UD with two mmWave 2×2 antenna arrays, according to an embodiment.

In contrast, the UD will likely need to minimize the number of arrays to minimize power consumption and cost. As a result, as illustrated in the example of FIG. 5, only two arrays, each of single polarization, may be provided. Again, patch antennas may be used, but the beamwidths will be larger than the access case (around 90 degrees) out of necessity to have coverage in all directions. The UD may also only have a single transceiver which may necessitate switching between the two arrays based on which one has the best signal strength.

Figure 6:
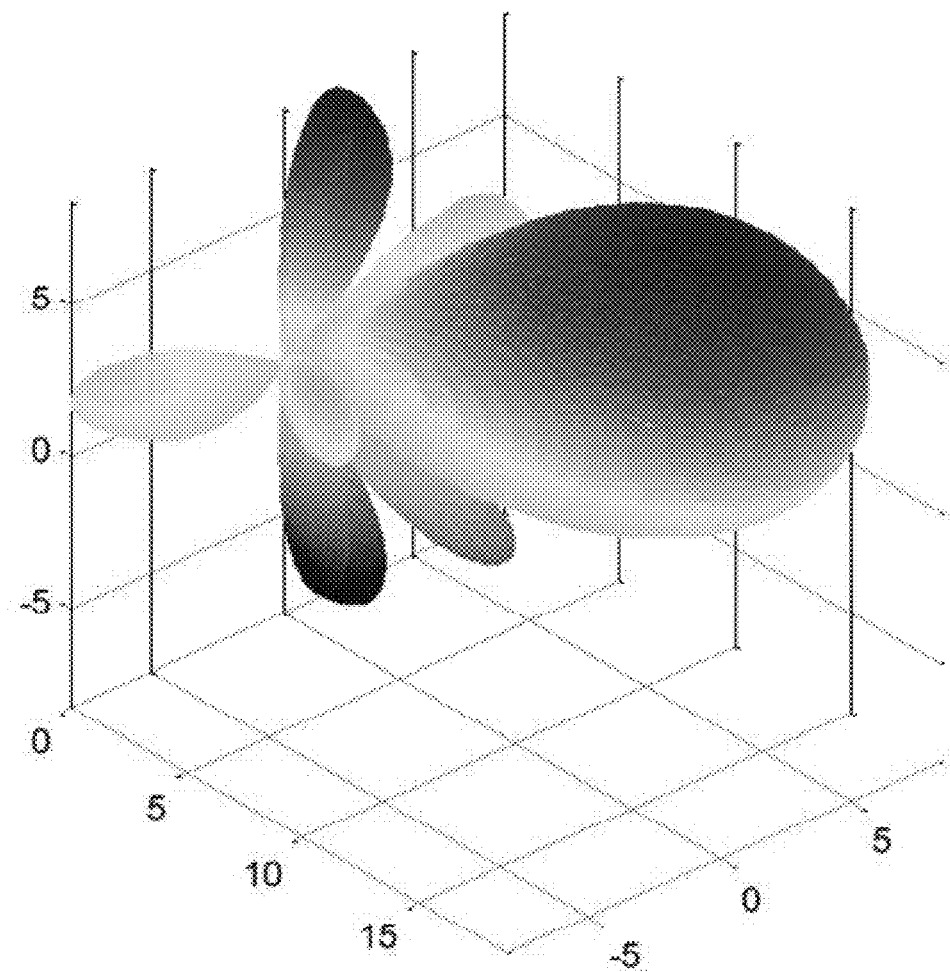
FIG. 6 illustrates an example beam for a 4×4 array with 0.5 wavelength spacing in both azimuth and elevation directions, according to one embodiment.

As mentioned above, the large arrays at the AP may be needed to provide coverage in the mmWave system (e.g., up to 100 m using a reflective path) and also for obtaining peak data rates (up to 10 Gbps). However, the use of large arrays could mean that relatively narrow beams (aka pencil beams) are formed which causes issues when synchronizing to the system and also complicates link establishment since the beams need to be aligned first before communication is possible. An example of a narrow beam created with a 4×4 array of antennas with 0.5 wavelength spacings in both the azimuth and elevation directions is illustrated in FIG. 6 (note that the figure is in a dB scale). The system uses these beams to cover the sector then the maximum gain only occurs when the path to the UD lines up exactly with the center of the beam. For example, if the system uses 16 of these beams (uniformly sampling the sector in azimuth and elevation) then the worst-case loss from maximum gain would be around 7.4 dB. Increasing the number to 36 beams, the worst-case loss drops to around 3.0 dB, and further increasing to 64 beams would drop the worst-case loss to around 1.2 dB. Of course the increase in the number of beams may require a more complicated beam alignment procedure.

It is noted that when the beams are misaligned, the UD will receive an attenuated signal. In the example of FIG. 6, with a 4×4 array, a 30 dB attenuation can be seen from maximum gain to minimum gain. The attenuation when misaligned may be used to mitigate an AGC setting that is too high when the UD is close to the AP and the path loss is low.

Figure 7:
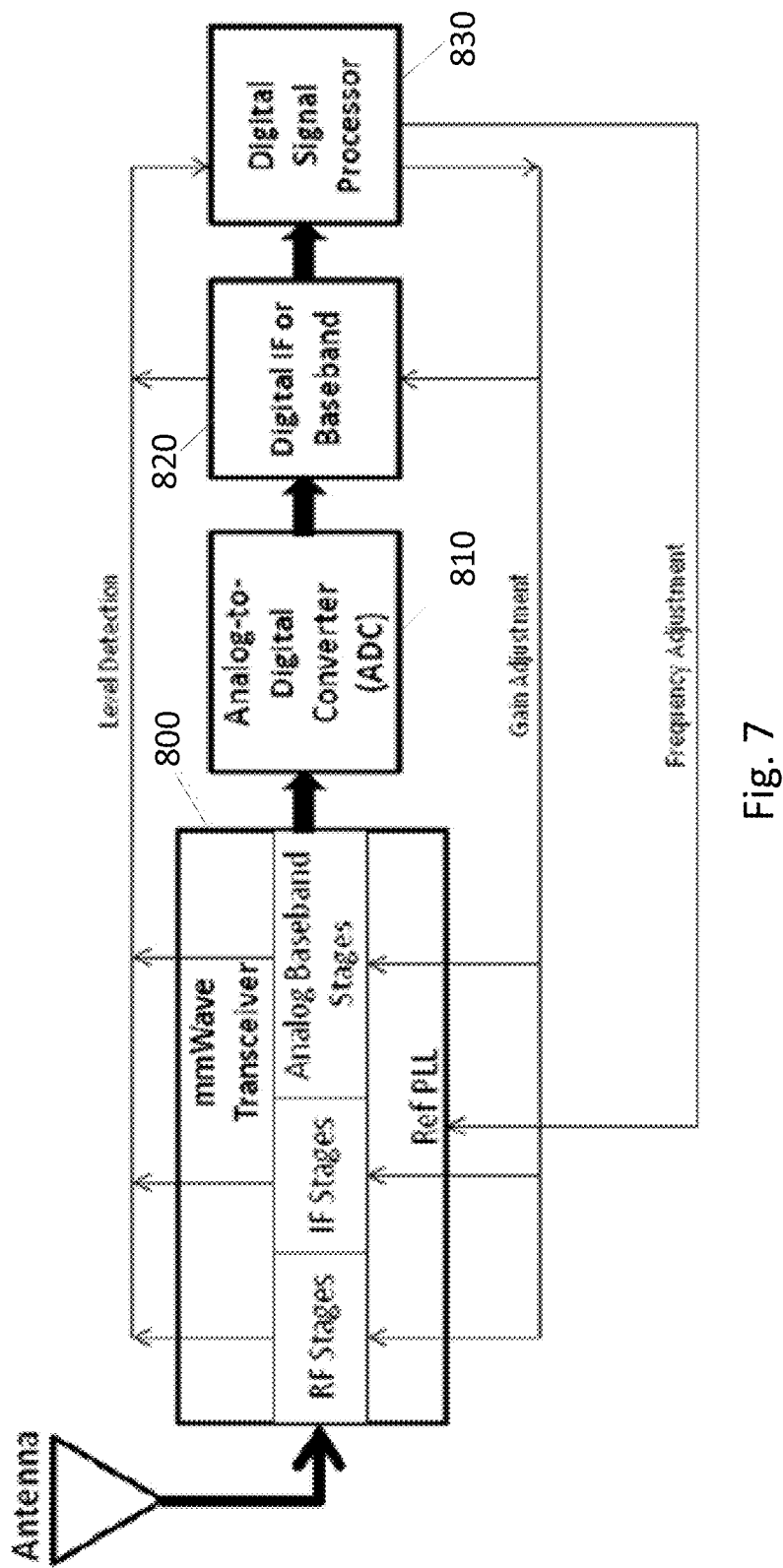
FIG. 7 illustrates an example block diagram of a UD receiver, according to an embodiment.

FIG. 7 illustrates a block diagram of an example UD receiver, according to one embodiment. In this embodiment, the receiver may include a mmWave transceiver 800 that demodulates the signal and then sends it through an analog gain stage prior to being converted to a digital representation with a Analog-to-Digital Converter (ADC) 810. The mmWave transceiver can either employ a direct conversion receiver or a heterodyne receiver structure. At digital IF or baseband 820, the analog signal can be sampled at intermediate frequency (IF) or first converted to Inphase (I) and Quadrature (Q) base signal and then sampled independently.

The resulting digital signal will be demodulated at base band using a digital signal processor 830.

The baseband processing can determine both the gain setting for the analog AGC and the frequency offset for the AFC. If the gain is set too high, the input waveform will be clipped and distorted by the ADC. If the gain is set too low, the analog waveform may not be detected by the ADC. The frequency offset is corrected prior to demodulating any data. As illustrated in the example of FIG. 7, the frequency is corrected in the analog domain by adjusting the reference clock in the mmWave transceiver. However, AFC may also be applied directly in the digital domain within the digital signal processor 830. Level detection at various points in the transceiver lineup, pre-ADC, are shown in FIG. 7 as is multiple points for gain adjustment, including feedback and adjustment post-ADC in the digital domain. Enabling multiple points in the receiver lineup for level over-range detection and gain adjustment provides the flexibility for a maximum possible AGC dynamic range while still managing and controlling the receiver noise figure; the opportunity to increase the gain in the digital baseband also offers a method to compensate the gain reduction in the RF front-end. Since these elements all come under digital signal processing control they can also be managed from the time/phase delay perspective.

Figure 8:
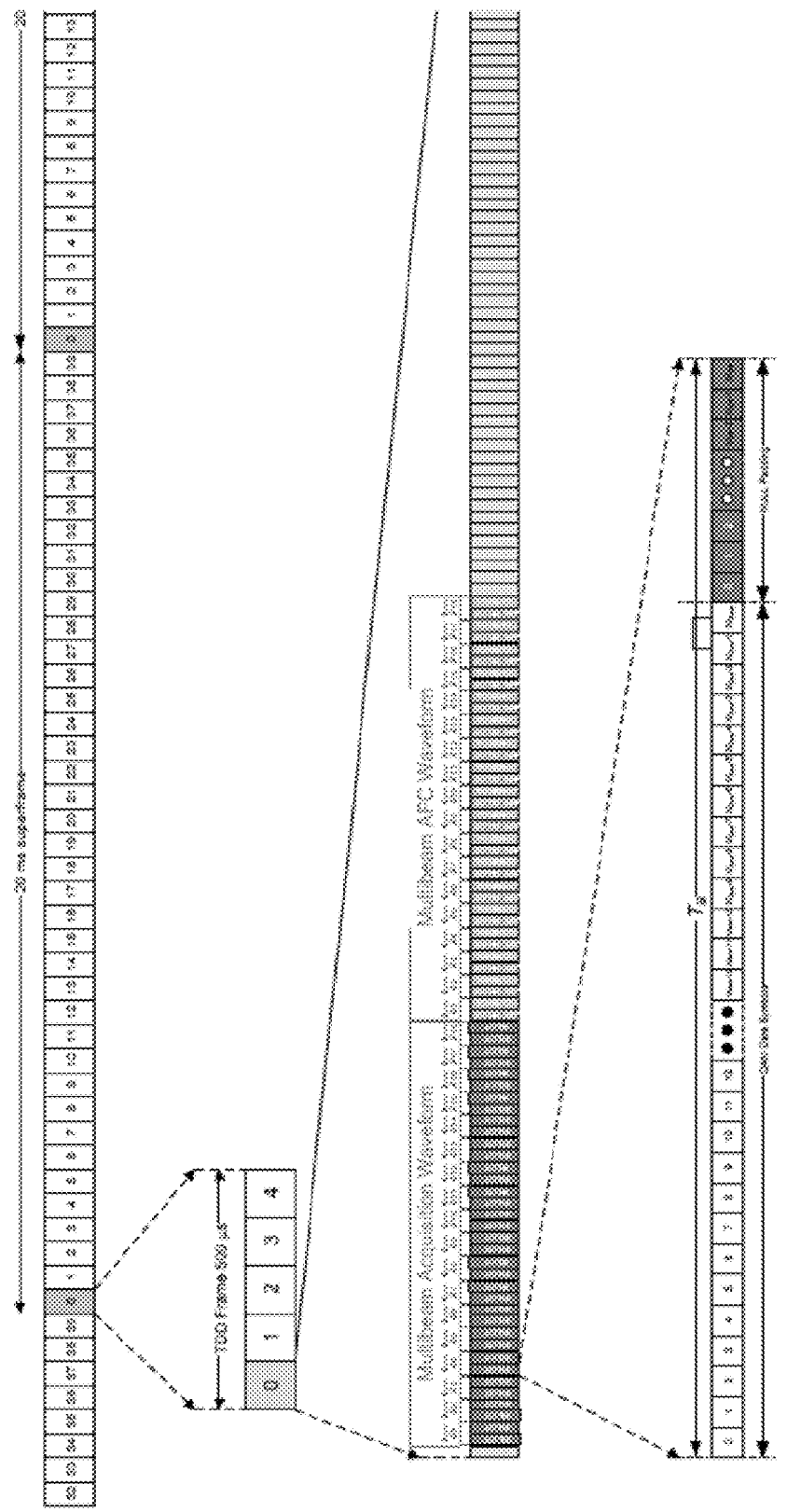
FIG. 8 illustrates an example of a frame structure, according to an embodiment.

An example frame structure with an interleaved multibeam acquisition and frequency correction waveform that provides concurrent beam selection, AGC and AFC is illustrated in FIG. 8. In this embodiment, the acquisition waveform is transmitted once per superframe. The Multibeam Acquisition Waveform includes two consecutive pilot blocks transmitted on 18 different beams where the pilot block may contain symbols known to both the AP and the UD. The use of two repeated pilot blocks may enable the use of simple initial timing acquisition algorithms plus very coarse frequency correction. The pilot block may be a null cyclic prefix (NullCP) single carrier pilot block or any other modulated pilot block like an orthogonal frequency division multiplexing (OFDM) pilot blocks. The Multibeam Acquisition Waveform is followed by Multibeam AFC Waveform transmitted again on the same 18 beams with two blocks transmitted per beam. In this example, one symbol block is an AFC pilot and the other symbol block is a control block carrying control information. In both waveforms, the symbol block is shown to contain $M_{data}$ QAM symbols followed by $M_{CP}$ QAM symbol periods of null or empty data. The null period can be used as a switching period between beams. In other embodiments, the symbol block could be a regular cyclic prefix block (e.g., and OFDM symbol block) where a group of data symbols had a cyclic prefix attached (a cyclic prefix is a repetition at the beginning of the symbol block of the last $N_{CP}$ symbols in a symbol block).

The Multibeam AFC Waveform is transmitted a certain time interval, called the AFC interval, after the last symbol of the Multibeam Acquisition Waveform is sent. This AFC interval can be implemented as a clock which starts when the last symbol of the Multibeam Acquisition Waveform is sent and expires a predetermined fixed time later as specified by the AFC interval. Upon expiration of the clock the Multibeam AFC Waveform would be sent. The AFC interval could also be a certain number of symbols such that the first symbol of the Multibeam AFC Waveform is sent a predetermined fixed number of symbol numbers (or times), specified by the AFC interval, after the last symbol of the Multibeam Acquisition waveform is sent.

The length of the AFC interval will be governed by the maximum frequency offset which is desired to be estimated by the UD. The exact value of the maximum offset will depend on various factors such as the accuracy of the clocks, local oscillators, etc., in the UD. For example, if a maximum 10 kHz frequency offset is possible between the UD and the AP then the range of frequency offsets can be from −10 kHz to +10 kHz. Then using the Nyquist sampling theorem known in the art, the AFC interval would have to be no more than 1/(20 kHz)=50 µs.

It is noted that more than one frequency correction could take place. For example, a coarse frequency correction can be done with a smaller AFC interval between the Multibeam Acquisition Waveform and the Multibeam AFC Waveform. Then a fine frequency correction can be done with a larger AFC interval between the two waveforms.

It is noted that, in an embodiment, both the Multibeam AFC waveform and the Multibeam Acquisition Waveform transmit pilot blocks from all of the possible beams. However, in other embodiments, the Multibeam Acquisition Waveform and/or the Multibeam AFC Waveform may only transmit pilot blocks from a subset of all possible beams. One example is to only transmit from a few beams so that the AFC interval can be very short thus enabling a larger frequency offset to be estimated. Another example is to limit the number of beams used to keep the total transmission time low thus improving the efficiency of the mmWave system.

Figure 9B:
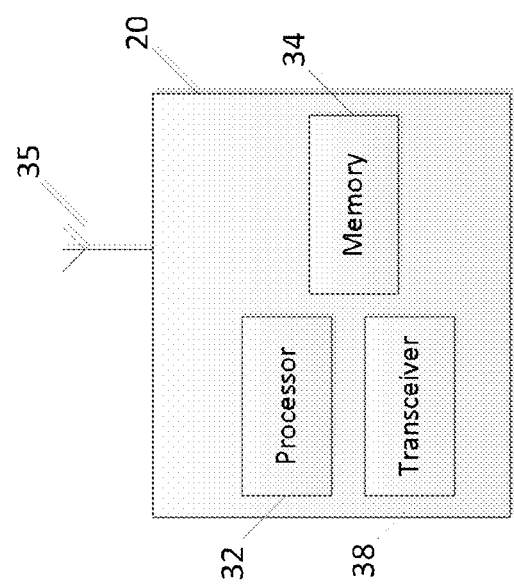
FIG. 9b illustrates an apparatus according to another embodiment.
Figure 9A:
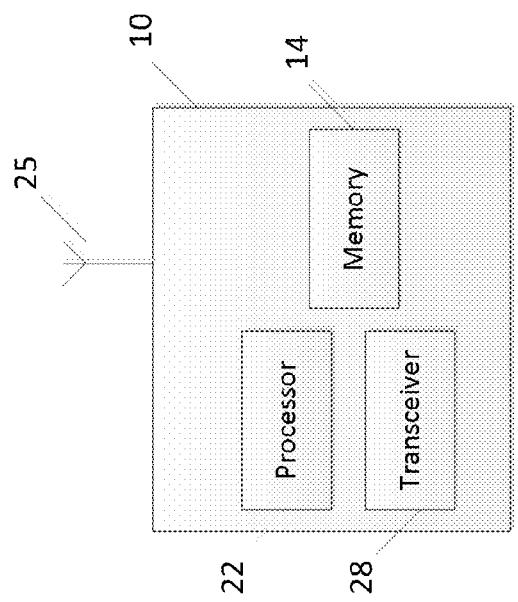
FIG. 9a illustrates an apparatus according to one embodiment.

FIG. 9a illustrates an example of an apparatus 10 according to an embodiment. In one embodiment, apparatus 10 may be a UD or mobile device. For instance, apparatus 10 may be a device as illustrated in FIG. 3 or 5 discussed above. Further, it should be noted that one of ordinary skill in the art would understand that apparatus 10 may include components or features not shown in FIG. 9a. Only those components or features necessary for illustration of the invention are depicted in FIG. 9a.

As illustrated in FIG. 9a, apparatus 10 includes a processor 22 for processing information and executing instructions or operations. Processor 22 may be any type of general or specific purpose processor. While a single processor 22 is shown in FIG. 9a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 further includes a memory 14, which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas 25 for transmitting and receiving signals and/or data to and from apparatus 10. Apparatus 10 may further include a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a UD or mobile device in a mmWave system. In this embodiment, apparatus 10 may be controlled by memory 14 and processor 22 to set the AGC in the receiver to maximum gain (such that the noise floor is at the bottom of the ADC range), to detect one or more acquisition bursts in the multi-beam acquisition sequence, and to detect the corresponding AFC bursts in the multi-beam AFC sequence one AFC interval later. Additionally, apparatus 10 may be controlled by memory 14 and processor 22 to calculate the frequency offset based on the detected acquisition burst and AFC burst, to receive the communication of the multi-beam pattern if it is not known a priori, and to reduce the AGC gain setting to see if a beam with a stronger signal might be detected.

FIG. 9b illustrates an example of an apparatus 20 according to another embodiment. In an embodiment, apparatus 20 may be an AP in a communications network, such as a mmWave system. It should be noted that one of ordinary skill in the art would understand that apparatus 20 may include components or features not shown in FIG. 9b. Only those components or features necessary for illustration of the invention are depicted in FIG. 9b.

As illustrated in FIG. 9b, apparatus 20 includes a processor 32 for processing information and executing instructions or operations. Processor 32 may be any type of general or specific purpose processor. While a single processor 32 is shown in FIG. 9b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 further includes a memory 34, which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also include one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be an AP in a mmWave system. In this embodiment, apparatus 20 may be controlled by memory 34 and processor 32 to transmit a multi-beam acquisition sequence comprising a short acquisition burst repeated on a defined pattern of antenna beams, and to transmit a multibeam AFC sequence comprising a short AFC burst repeated on the same defined pattern of antenna beams and starting a fixed "AFC interval" after the multi-beam acquisition sequence. Optionally, apparatus 20 may be controlled by memory 34 and processor 32 to communicate the multi-beam pattern if it is not known by the AP and UD a priori. In addition, apparatus 20 may be controlled by memory 34 and processor 32 to repeat the multi-beam acquisition sequence and possibly the multi-beam AFC sequence to allow AGC adjustment.

Figure 10:
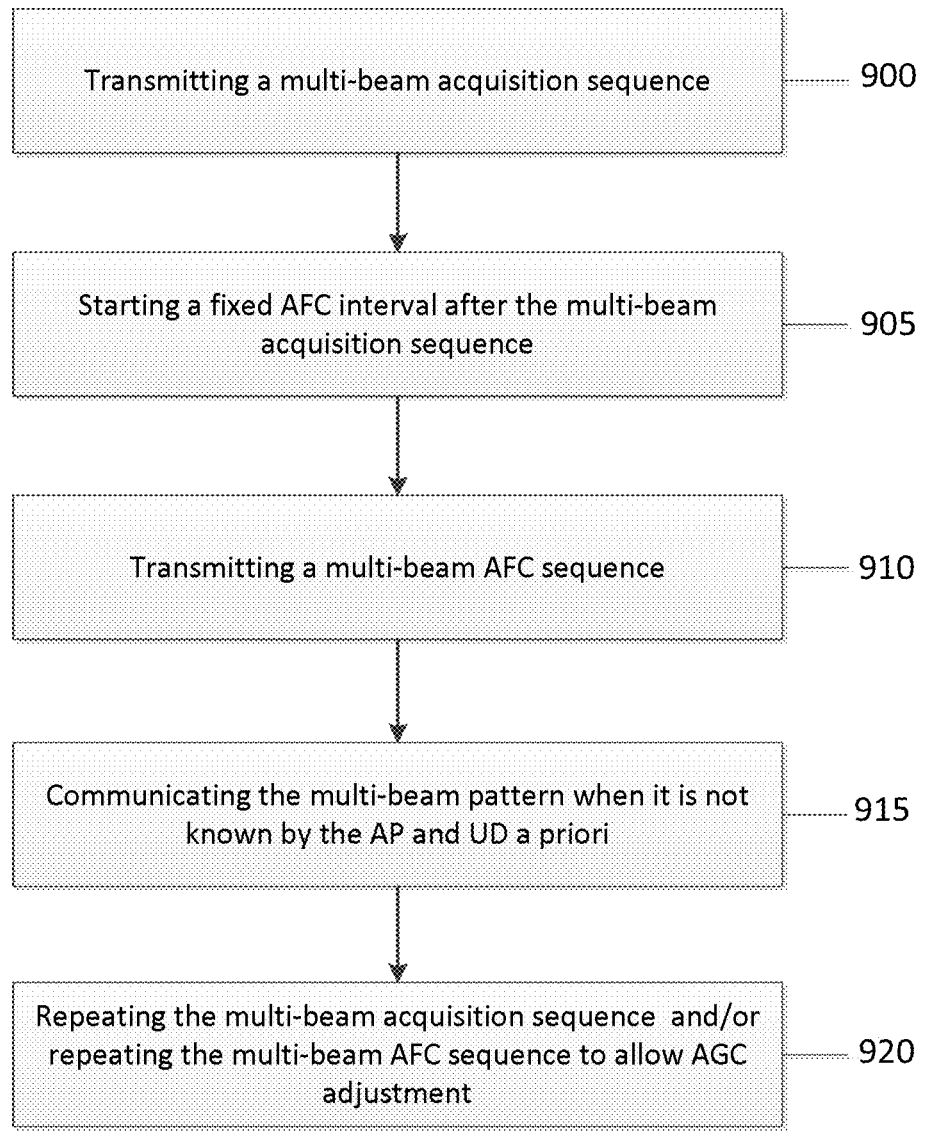
FIG. 10 illustrates an example of a flow diagram of a method according to one embodiment.

FIG. 10 illustrates an example of a flow diagram of a method, according to an embodiment. In this embodiment, the method may be performed by the AP described above. The method may include, at 900, transmitting, by the AP, a multi-beam acquisition sequence comprising a short acquisition burst repeated on a defined pattern of antenna beams. At 905, the method may include starting a fixed AFC interval after the multi-beam acquisition sequence, and, at 910, transmitting a multi-beam AFC sequence comprising a short AFC burst repeated on said defined pattern of antenna beams.

In some embodiment, the method may optionally include, at 915, communicating the multi-beam pattern when it is not known by the AP and UD a priori. At 920, the method may include repeating the multi-beam acquisition sequence to allow AGC adjustment and/or repeating the multi-beam AFC sequence to allow AFC adjustment.

Figure 11:
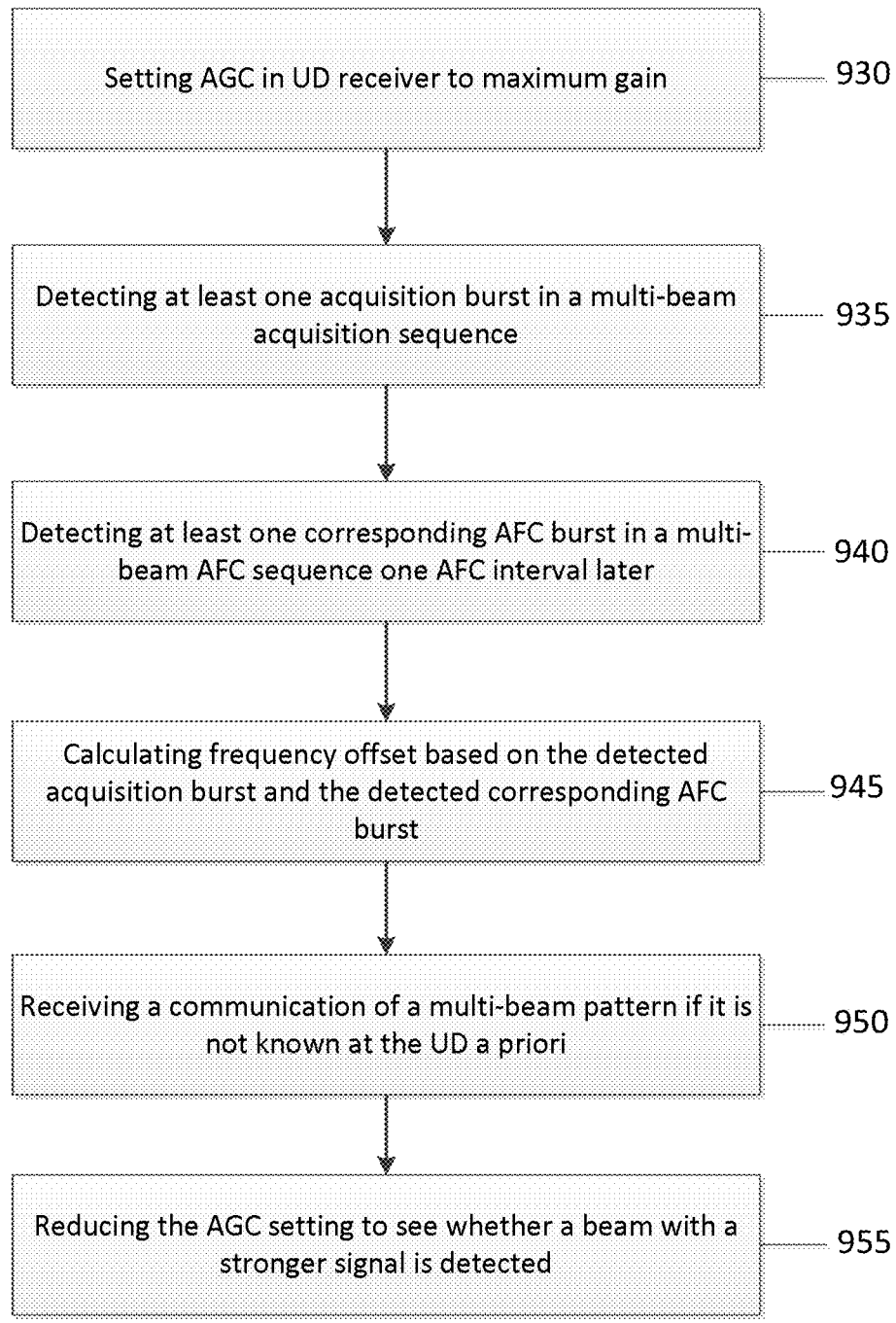
FIG. 11 illustrates an example of a flow diagram of a method according to another embodiment.

FIG. 11 illustrates an example of a flow diagram of a method, according to another embodiment. In this embodiment, the method may be performed by the UD described above. The method may include, at 930, setting, by the UD, AGC in its receiver to maximum gain (or alternatively the UD could set the AGC to some large gain not necessarily the maximum). At 935, the method may include detecting at least one acquisition burst in a multi-beam acquisition sequence, and, at 940, detecting at least one corresponding AFC burst in a multi-beam AFC sequence one AFC interval later. The method may further include, at 945, calculating a frequency offset based on the detected at least one acquisition burst and the detected at least one corresponding AFC burst. In an embodiment, the method may include, at 950, receiving a communication of a multi-beam pattern if it is not known at the user device a priori. At 955, the method may further include reducing the AGC setting to determine whether a beam with a stronger signal is detected. In another embodiment, the UD may further communicate the best beam (i.e., the one whose acquisition and/or AFC pilot transmission received with the highest gain) to the AP.

In some embodiments, the functionality of any of the methods described herein, such as those of FIGS. 11 and 12, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   transmitting, by an access point in a millimeter wave (mm-Wave) system, a first multi-beam sequence comprising a first burst type repeated on different antenna beams with a defined pattern of antenna beams;
   transmitting a second multi-beam sequence comprising a second burst type repeated on the different antenna beams with said defined pattern of antenna beams after an automatic frequency correction (AFC) interval, wherein the first multi-beam sequence and the second multi-beam sequence are different.

2. The method according to claim 1, wherein the first multi-beam sequence comprises a multi-beam acquisition sequence, and the first burst type comprises an acquisition burst.

3. The method according to claim 1, wherein the second multi-beam sequence comprises a multi-beam AFC sequence, and the second burst type comprises an AFC burst.

4. The method according to claim 1, wherein the AFC interval comprises a fixed number of symbol numbers between a last symbol transmitted in the first multi-beam sequence and a first symbol of the second multi-beam sequence.

5. The method according to claim 1, wherein the AFC interval is a predetermined time interval between a last symbol transmitted in the first multi-beam sequence and a first symbol of the second multi-beam sequence.

6. The method according to claim 1, wherein the first burst type and second burst type are identical.

7. The method according to claim 1, further comprising waiting to transmit the second multi-beam sequence until one AFC interval after the multi-beam acquisition sequence had initiated.

8. The method according to claim 1, wherein the first multi-beam sequence duration is one AFC interval long.

9. The method according to claim 1, wherein the AFC interval is chosen to permit an estimation of a frequency offset up to a predetermined maximum value.

10. The method according to claim 1, further comprising communicating the multi-beam pattern when it is not known by the access point and user device a priori.

11. The method according to claim 1, further comprising repeating the multi-beam acquisition sequence to allow automatic gain control (AGC) adjustment.

12. The method according to claim 1, further comprising repeating the multi-beam automatic frequency correction (AFC) sequence to allow automatic gain control (AGC) adjustment.

13. An apparatus, comprising:
    at least one processor; and
    at least one memory comprising computer program code, wherein the at least one memory and the computer program code are configured, with the at least one processor, to cause the apparatus at least to
    transmit a first multi-beam sequence comprising a first burst type repeated on different antenna beams with a defined pattern of antenna beams;
    transmit a second multi-beam sequence comprising a second burst type repeated on the different antenna beams with said defined pattern of antenna beams after an automatic frequency correction (AFC) interval, wherein the first multi-beam sequence and the second multi-beam sequence are different.

14. The apparatus according to claim 13, wherein the first multi-beam sequence comprises a multi-beam acquisition sequence, and the first burst type comprises an acquisition burst.

15. The apparatus according to claim 13, wherein the second multi-beam sequence comprises a multi-beam AFC sequence, and the second burst type comprises an AFC burst.

16. The apparatus according to claim 13, wherein the AFC interval comprises a fixed number of symbol numbers between a last symbol transmitted in the first multi-beam sequence and a first symbol of the second multi-beam sequence.

17. The apparatus according to claim 13, wherein the AFC interval is a predetermined time interval between a last symbol transmitted in the first multi-beam sequence and a first symbol of the second multi-beam sequence.

18. The apparatus according to claim 13, wherein the first burst type and second burst type are identical.

19. The apparatus according to claim 13, wherein the at least one memory and the computer program code are further configured, with the at least one processor, to cause the apparatus at least to wait to transmit the second multi-beam sequence until one AFC interval after the multi-beam acquisition sequence had initiated.

20. The apparatus according to claim 13, wherein the first multi-beam sequence duration is one AFC interval long.

21. The apparatus according to claim 13, wherein the AFC interval is chosen to permit an estimation of a frequency offset up to a predetermined maximum value.

22. The apparatus according to claim 13, wherein the apparatus comprises an access point in a millimeter wave (mm-Wave) system.

23. The apparatus according to claim 22, wherein the at least one memory and the computer program code are further configured, with the at least one processor, to cause the apparatus at least to communicate the multi-beam pattern when it is not known by the access point and user device a priori.

24. The apparatus according to claim 13, wherein the at least one memory and the computer program code are further configured, with the at least one processor, to cause the apparatus at least to repeat the multi-beam acquisition sequence to allow automatic gain control (AGC) adjustment.

25. The apparatus according to claim 13, wherein the at least one memory and the computer program code are further configured, with the at least one processor, to cause the apparatus at least to repeat the multi-beam automatic frequency correction (AFC) sequence to allow automatic gain control (AGC) adjustment.

26. A computer program, embodied on a non-transitory computer readable medium, wherein the computer program is configured to control a processor to perform a process, comprising:
transmitting, by an access point in a millimeter wave (mm-Wave) system, a first multi-beam sequence comprising a first burst type repeated on different antenna beams with a defined pattern of antenna beams;
transmitting a second multi-beam sequence comprising a second burst type repeated on the different antenna beams with said defined pattern of antenna beams after an automatic frequency correction (AFC) interval, wherein the first multi-beam sequence and the second multi-beam sequence are different.

27. A method, comprising:
setting, by a user device, automatic gain control (AGC) in a receiver of the user device to a large gain;
detecting at least one acquisition burst in a multi-beam acquisition sequence comprising a first burst type repeated on different antenna beams with a defined pattern of antenna beams; and
detecting at least one corresponding automatic frequency correction (AFC) burst in a multi-beam AFC sequence one AFC interval later comprising a second burs type repeated on the different antenna beams with said defined pattern of antenna beams,
wherein the multi-beam acquisition sequence and the automatic multi-beam AFC sequence are different.

28. The method according to claim 27, wherein the large gain for the AGC is a maximum gain.

29. The method according to claim 27, further comprising calculating a frequency offset based on the detected at least one acquisition burst and the detected at least one corresponding automatic frequency correction (AFC) burst.

30. The method according to claim 27, further comprising receiving a communication of a multi-beam pattern if it is not known at the user device a priori.

31. The method according to claim 27, further comprising reducing the automatic gain control (AGC) setting to determine whether a beam with a stronger signal is detected.

32. The method according to claim 27, further comprising determining the initial timing synchronization point from the multi-beam acquisition sequence.

33. The method according to claim 27, further comprising determining a strongest beam from the multi-beam acquisition sequence and reporting it back to the access point.

34. An apparatus, comprising:
at least one processor; and
at least one memory comprising computer program code, wherein the at least one memory and the computer program code are configured, with the at least one processor, to cause the apparatus at least to
set automatic gain control (AGC) in a receiver of the user device to a large gain;
detect at least one acquisition burst in a multi-beam acquisition sequence comprising a first burst type repeated on different antenna beams with a defined pattern of antenna beams; and
detect at least one corresponding automatic frequency correction (AFC) burst in a multi-beam AFC sequence one AFC interval later comprising a second burst type repeated on the different antenna beams with said defined pattern of antenna beams,
wherein the multi-beam acquisition sequence and the automatic multi-beam AFC sequence are different.

35. The apparatus according to claim 34, wherein the large gain for the AGC is a maximum gain.

36. The apparatus according to claim 34, wherein the at least one memory and the computer program code are further configured, with the at least one processor, to cause the apparatus at least to calculate a frequency offset based on the detected at least one acquisition burst and the detected at least one corresponding automatic frequency correction (AFC) burst.

37. The apparatus according to claim 34, wherein the apparatus comprises a user device in a millimeter wave system (mmWave).

38. The apparatus according to claim 37, wherein the at least one memory and the computer program code are further configured, with the at least one processor, to cause the apparatus at least to receive a communication of a multi-beam pattern if it is not known at the user device a priori.

39. The apparatus according to claim 34, wherein the at least one memory and the computer program code are further configured, with the at least one processor, to cause the apparatus at least to reduce the automatic gain control (AGC) setting to determine whether a beam with a stronger signal is detected.

40. The apparatus according to claim 34, further comprising determining the initial timing synchronization point from the multi-beam acquisition sequence.

41. The apparatus according to claim 34, further comprising determining a strongest beam from the multi-beam acquisition sequence and reporting it back to the access point.

42. A computer program, embodied on a non-transitory computer readable medium, wherein the computer program is configured to control a processor to perform a process, comprising:
setting, by a user device, automatic gain control (AGC) in a receiver of the user device to a large gain;
detecting at least one acquisition burst in a multi-beam acquisition sequence comprising a first burst type repeated on different antenna beams with a defined pattern of antenna beams; and
detecting at least one corresponding automatic frequency correction (AFC) burst in a multi-beam AFC sequence one AFC interval later comprising a second burst type repeated on the different antenna beams with said defined pattern of antenna beams,
wherein the multi-beam acquisition sequence and the automatic multi-beam AFC sequence are different.

* * * * *